United States Patent [19]

Koeling et al.

[11] Patent Number: 4,711,303

[45] Date of Patent: Dec. 8, 1987

[54] METHOD AND MEANS FOR DETERMINING THE SUBSURFACE POSITION OF A BLOWING WELL WITH RESPECT TO A RELIEF WELL

[75] Inventors: Thijs Koeling; Bernd C. Lehr; Willem Broekhuizen, all of Rijswijk, Netherlands

[73] Assignee: Shell Oil Company, Houston, Tex.

[21] Appl. No.: 654,579

[22] Filed: Sep. 26, 1984

[30] Foreign Application Priority Data

Oct. 11, 1983 [GB] United Kingdom ................. 8327178

[51] Int. Cl.$^4$ ...................... E21B 47/00; G01V 1/40
[52] U.S. Cl. ...................................... 166/250; 166/64; 175/40; 73/151; 181/104; 367/25
[58] Field of Search ................. 166/250, 254, 255, 64, 166/66; 175/40, 50, 45, 61; 33/126, 128.5, 126.6; 73/151; 367/27, 35, 25; 181/102, 104, 105

[56] References Cited

U.S. PATENT DOCUMENTS

| Re. 31,607 | 6/1984 | Vogel et al. | 181/102 |
| 3,282,355 | 11/1966 | Henderson | 175/40 |
| 3,683,326 | 8/1972 | White | 367/25 |
| 3,722,605 | 3/1973 | Isham | 175/61 |
| 4,016,942 | 4/1977 | Wallis, Jr. et al. | 175/45 |
| 4,105,993 | 8/1978 | Grassy et al. | 340/15.5 CP |
| 4,114,721 | 9/1978 | Glenn, Jr. | 181/102 |

Primary Examiner—Stephen J. Novosad
Assistant Examiner—Bruce M. Kisliuk

[57] ABSTRACT

The subsurface position of a blowing well with respect to an adjacent relief well is determined by detecting at a plurality of axially and tangentially spaced locations in the relief well acoustic waves emanating from a subsurface location of the blowing well. The distance between the wells is calculated on the basis of the difference in times of arrival of the waves at said axially spaced locations. The radial direction of the blowing well relative to the relief well is determined by measuring the acoustic intensity resulting from the waves at each of said tangentially spaced locations.

14 Claims, 7 Drawing Figures

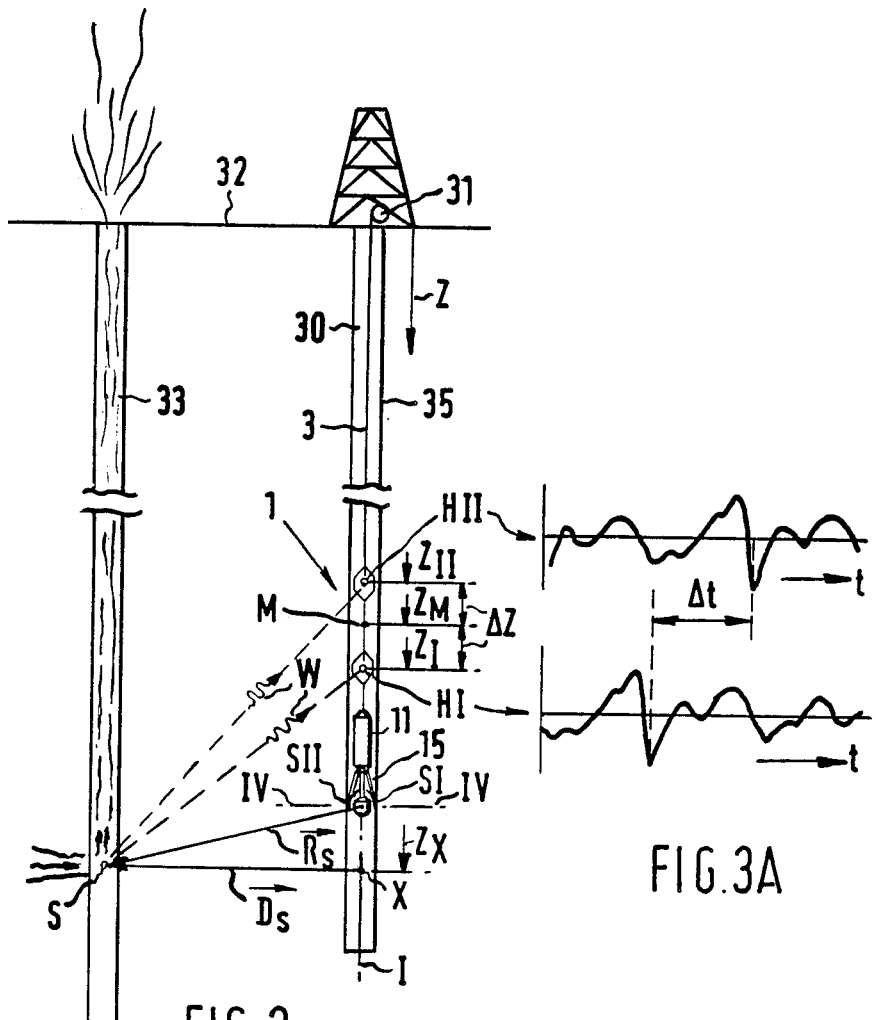
FIG. 2
FIG. 3A
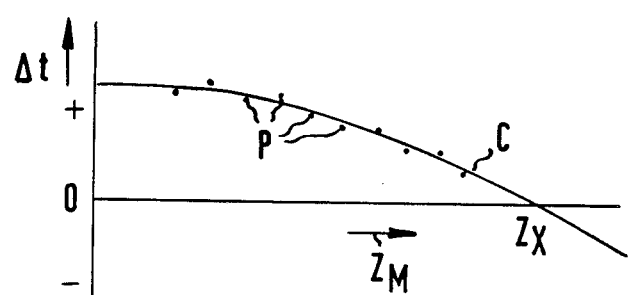
FIG. 3B

METHOD AND MEANS FOR DETERMINING THE SUBSURFACE POSITION OF A BLOWING WELL WITH RESPECT TO A RELIEF WELL

BACKGROUND OF THE INVENTION

The invention relates to a method and means for determining the subsurface position of a blowing well—from which fluids such as oil or gas escape in an uncontrolled manner—with respect to an adjacent relief well.

It is known in the art to stop the flow through a blowing well by drilling a relief well from a surface location near the blowing well. Such a relief well is drilled with the intention of intercepting the blowing well, preferably at a subsurface location near the downhole "source" location at which the fluids enter the wellbore at high velocity to enable the injection of water and/or weighted fluids via the relief well into the blowing well.

It is furthermore known in the art to make use of sound waves emanating from the blowing well to orient the drilling direction of the relief well towards the blowing well. U.S. Pat. No. 3,282,355 discloses an acoustic-wave receiving device that can be lowered into a relief well to detect acoustic waves emanating from an adjacent blowing well in order to obtain information on the positions of the wells relative to each other. U.S. Pat. No. 3,722,605 discloses an instrument for finding the radial direction of a blowing well with respect to a relief well. The instrument comprises a plurality of acoustic receivers mounted at various tangentially spaced locations on a tubular housing, which housing is inserted in, or forms part of, a non-rotating drill string located in the relief well. By comparing the arrival times of sound waves emanating from the blowing well at the tangentially spaced receivers an indication is obtained of the radial orientation of the blowing well relative to the relief well.

Although the known instruments may provide useful information on the position of the blowing well, these instruments are not able to indicate the position of this well in a sufficiently accurate manner.

SUMMARY OF THE INVENTION

An object of the present invention is to provide a method and means for accurately determining the position of a blowing well relative to an adjacent relief well.

The method according to the invention comprises the steps of (a) detecting at a plurality of locations along the longitudinal axis of the relief well acoustic waves emanating from a subsurface location of the blowing well and determining the difference in times of arrival of the waves at said axially spaced locations, and (b) detecting the waves at a plurality of tangentially spaced locations alongside the borehole wall of the relief well and measuring the acoustic intensity resulting from the waves at each of said tangentially spaced locations.

The means according to the invention comprises an array of acoustic receivers carried by an elongate support, the receivers being connected at predetermined intervals along the longitudinal axis of the support, and a frame carrying an assembly of acoustic sensors in such a manner that each sensor is movable in a substantially radial direction with respect to a central axis of the frame.

BRIEF DESCRIPTION OF THE DRAWINGS

Various types of equipment may be used to practice the invention and a preferred embodiment will be described with reference to the accompanying drawings in which:

FIG. 2 shows a vertical section of a blowing well and a relief well in which the instrument of FIG. 1 is suspended.

FIG. 3A illustrates the difference $\Delta t$ in arrival times of acoustic waves originating from the blowing well between two acoustic receivers of the instrument in the position thereof shown in FIG. 2.

FIG. 3B is a diagram in which the measured time differences $\Delta t$ are plotted versus the depth position of the instrument in the relief well.

DESCRIPTION OF PREFERRED EMBODIMENT

Figure 1:
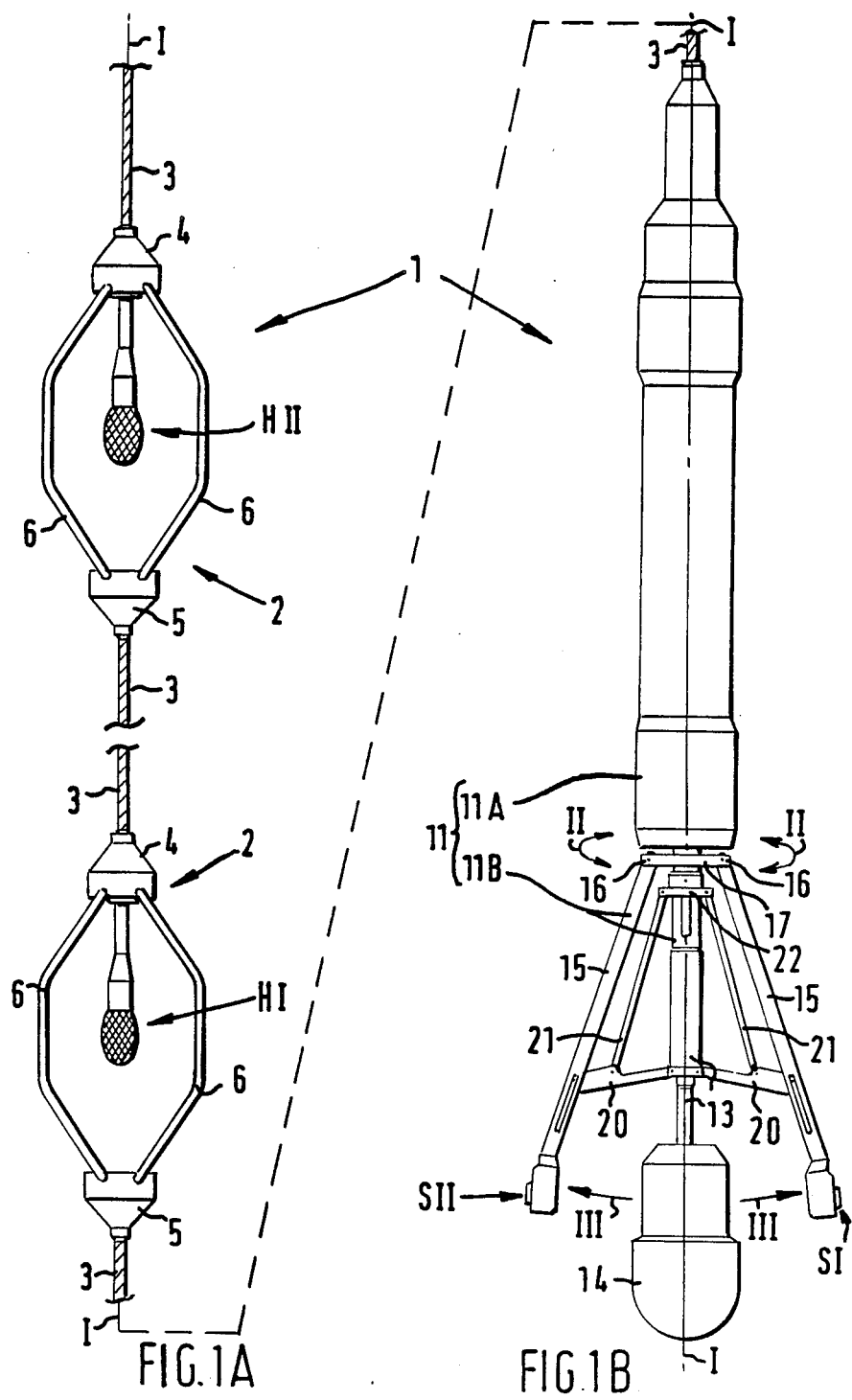
FIG. 1A is an elevation view of the upper part of an instrument according to the invention.
FIG. 1B is an elevation view of the lower part of an instrument according to the invention.

FIG. 1A shows the upper part of an instrument 1 according to the invention, which part comprises an array of two acoustic receivers HI and HII. The receivers are mounted in protective cages 2 that are shaped to aid in centralizing the receivers in a borehole (not shown). Each cage 2 comprises an upper end section 4 and a lower end section 5, which sections are interconnected by means of four hollow rods 6. The cages 2 are included in an elongate support cable 3 in such a manner that the receivers HI and HII are arranged at a predetermined interval along the longitudinal axis I of the cable 3. The support cable 3 includes various power- and signal-transmission lines (not shown), which lines pass through the cages 2 via the end sections 4 and 5 and the rods 6. The acoustic receivers HI and HII are piezoelectric hydrophones that are suitable for transducing detected acoustic waves into corresponding electric signals. The way in which electric signals produced by the receivers HI and HII are, after amplification and transmission thereof via the signal-transmission lines, processed in order to determine the distance between a blowing well and a relief well will be explained with reference to FIGS. 2, 3A and 3B.

FIG. 1B shows the lower part of the instrument 1, which part includes a frame 11 connected at the upper end thereof to the lower end of the support cable 3. The frame 11 consists of an upper frame section 11A and of a lower frame section 11B. The two frame sections 11A and 11B have a common central axis coinciding with the longitudinal axis I of the support cable 3. The lower frame section 11B includes an axially extending shaft 13 which is at the upper end thereof connected to the upper frame section 11A by means of a bearing assembly (not shown) allowing the shaft 13, and thus the entire lower frame section 11B, to rotate about axis I relative to the upper frame section 11A (see arrows II). The shaft 13 carries at the lower end thereof a rubber nose 14 for protecting the instrument 1 during lowering into a borehole. Three pivot arms 15 (see also FIG. 4) are pivotally connected at their upper ends to a collar 17 by means of hinge pins. The collar 17 is mounted on the shaft 13. The arms 15 carry at the lower ends acoustic sensors SI, SII and SIII (the sensor SIII is not shown in FIG. 1B). The hinge pins 16 are oriented such that the arms 15 can be pivoted in planes of rotation passing through the central axis I, which planes intersect each other at angles of 120 degrees (see FIG. 4).

By pivoting the arms 15 the sensors SI, SII and SIII are moved in substantially radial directions with respect to the central axis I (see arrows III). The arms 15 can be pivoted simultaneously from a retracted position towards an extended position thereof by means of an assembly of levers 20. These levers 20 each have one end slidingly connected to 15, and the other end pivotally connected to the shaft 13. The levers 20 are connected to a sliding collar 22 by means of an assembly of rods 21. The collar 22 is moved axially relative to the shaft 13 by means of a suitable actuator mechanism (not shown). When the sliding collar 22 is moved upward relative to the shaft 13, the arms 15 are pivoted simultaneously to the extended position, and when the arms 15 are to be retracted the collar 22 is moved downward relative to the shaft 13.

Each arm 15 contains a signal-transmission line (not shown) for providing an electric connection between the acoustic sensors SI, SII or SIII and signal-amplification means (not shown) arranged in the upper frame section 11A. The acoustic sensors SI, SII and SIII are tri-axial accelerometers of a type known per se, which accelerometers are each secured in a flexible, vibration absorbing manner to the arms 15 (such as by embedding in an elastomer) to provide acoustic decoupling between the accelerometers and the arms 15.

The upper frame section 11A houses, besides the actuator mechanism for sliding the collar 22, a mechanism for rotating the shaft 13 over any desired angle about the axis I and means for measuring the angular displacement of the shaft 13 relative to the upper frame section 11A. The upper frame section 11A further includes a compass (not shown) for measuring the orientation thereof with respect to the magnetic field of the earth. It will be appreciated that by combining the data provided by the compass with the data provided by said means for measuring the angular displacement of the shaft 13 straightforward information is provided on the azimuth position of the shaft 13 and of the acoustic sensors SI, SII and SIII carried thereby.

As used in this specification and claims the term azimuth of a vector is defined as the angle measured in a plane orthogonal to the central axis I between the orthogonal projection of the vector on that plane and the orthogonal projection of the earth's magnetic-field vector on that plane.

FIG. 2 shows a blowing well 33, through which fluids such as oil and gas flow in an uncontrolled manner from a downhole source location S to the earth surface 32. A relief well 30 is drilled from a surface location near the blowing well 33, with the intention of intercepting the blowing well, preferably near the source location S, to enable the injection of water and-/or weighted fluids via the relief well into the blowing well.

After removal of the drilling assembly from the relief well 30 the instrument 1 of FIG. 1 has been lowered into this well 30 on the support cable 3 which is suspended from a reel 31 at the earth surface 32. During the lowering procedure the arms 15A-C of the frame 11 are in the retracted position. In the situation shown in FIG. 2 the instrument is in the operative position with the arms in the expanded position such that the acoustic sensors SI-SIII are in contact with the borehole wall 35, but in case of any axial movement of the instrument 1 in the borehole or in case the lower frame section 11B is rotated relative to the upper frame section 11A the arms are retracted again to avoid damage to the sensors.

The instrument is centralized in the relief well 30 such that the axis I of the instrument coincides with the longitudinal axis of the relief well. The point of closest approach between the source S and the axis I is indicated as the distance vector $\vec{D}_S$. The point X at which the distance vector $\vec{D}_S$ intersects the axis I is located at a depth $z_X$, whereas the two acoustic receivers HI and HII are located at depths $z_I$ and $z_{II}$, respectively, in the relief well 30.

As will be explained hereinbelow with reference to FIGS. 2 and 3, the depth $z_X$ and the length of the distance vector $\vec{D}_S$ are determined by the instrument 1 by measuring, at various depth positions of the instrument 1 in the relief well 30, the difference, if any, between the times of arrival of acoustic waves W originating from the source S at the two axially spaced receivers HI and HII. As will be explained thereafter with reference to FIGS. 4 and 5 the azimuth of the distance vector $\vec{D}_S$ is determined by the instrument 1 by measuring the tangential distribution alongside the borehole wall 35 of the acoustic intensity resulting from the waves W by means of the three tangentially spaced acoustic sensors SI-SIII.

The violent influx of fluid from the reservoir into the wellbore 33 at the source location S gives rise to acoustic waves W that propagate through the earth. The acoustic waves W are, after detection thereby by the receivers HI and HII, transduced into electric signals. The electric signal transduced in a certain interval of time t by the upper receiver HII is represented in the upper diagram of FIG. 3A, whereas the electric signal transduced in the same interval of time t by the lower receiver HI is represented in the lower diagram of FIG. 3A.

As illustrated in FIG. 3A the shapes of the signals obtained from the receivers HI and HII are similar, but there exists a time delay $\Delta t$ between these signals which time delay can be determined accurately by cross-correlating the signals obtained from the receivers HI and HII. The time delay $\Delta t$ equals the difference in arrival times of the acoustic waves W at the receivers due to the different distances between the "acoustic" source S and the receivers HI and HII.

When the acoustic waves W travel at a speed of propagation c through the earth from the source S to the two receivers HI and HII, it will be understood that said time delay $\Delta t$ is proportional to the difference in distance $\Delta r$ between the source S and each of the receivers HI and HII, since $$\Delta t = \frac{1}{c} \cdot \Delta r \qquad (1)$$

In case the axial spacing between the two receivers HI and HII is defined as $2\Delta z$ and in case the depth of the instrument 1 in the relief well 30 is measured by measuring (by means of a depth meter at the reel 31) the depth $z_M$ of a reference point M located at the midpoint between receivers HI and HII, the distance difference $\Delta r$ can be expressed in terms of $D_S$, $z_X$, $z_M$ and $\Delta z$ by Pythagoras' formula for rectangular triangles, since:

$$\Delta r = \sqrt{D_S^2 + (z_X - z_M + \Delta z)^2} - \sqrt{D_S^2 + (z_X - z_M - \Delta z)^2} \quad (2)$$

in which formula $D_S$ is the magnitude of the distance vector $\vec{D}_S$.

Combination of formulae (1) and (2) gives:

$$\Delta t = \quad (3)$$

$$\frac{1}{c} \left\{ \sqrt{D_S^2 + (z_X - z_M + \Delta z)^2} - \sqrt{D_S^2 + (z_X - z_M - \Delta z)^2} \right\}$$

In formula (3) the term $\Delta z$ is a constant, the term $z_M$ is measured by means of the depth meter (not shown) at the reel 31, and the term $\Delta t$ is determined, as explained hereinbefore, by cross-correlating the signals obtained from the receivers HI and HII. The other terms, to wit c, $D_S$ and $z_X$, are subsequently determined on the basis of the various time differences $\Delta t$ measured when the instrument 1 is located at various depths in the relief well 30.

Plotting of the time difference $\Delta t$ measured when the instrument is lowered or raised within a certain depth interval in the relief well 30 (such that the reference point M is located at various depths $z_M$) will reveal a plotted diagram as shown in FIG. 3B, in which diagram the plotted points P lie all—with some scatter—on a section of a single curve C.

Subsequently, the curve C that best fits to the plotted points P is calculated on the basis of formula (3) by means of a known iterative calculating procedure carried out by a computer. This calculating procedure reveals accurate values for the terms c, $z_X$ and $D_S$.

In the above manner the magnitude of the distance vector $\vec{D}_S$ and the depth $z_X$ at which this vector intersects the axis I are determined on the basis of the various differences in times of arrival of the acoustic waves at the two axially spaced receivers HI and HII, when positioning said array of receivers at various depths in the relief well 30.

If desired, instead of providing the instrument 1 with an array of two receivers HI and HII, the instrument 1 may be also provided with an array of three or more receivers. It will be understood that the use of three or more receivers has the advantage that several points P of the curve can be plotted simultaneously, without lowering or raising the instrument 1 in the borehole 30.

The method for determining the magnitude of the distance vector $\vec{D}_S$ has been described above for a vertical relief well parallel to a blowing well. It will be appreciated that the method can readily be applied in situations of non-parallel or curved borehole courses, provided that the course of the relief well is known.

The procedure for finding the azimuth of the distance vector $\vec{D}_S$ by means of the instrument 1 will now be explained with reference to FIGS. 2, 4 and 5.

Figure 4:
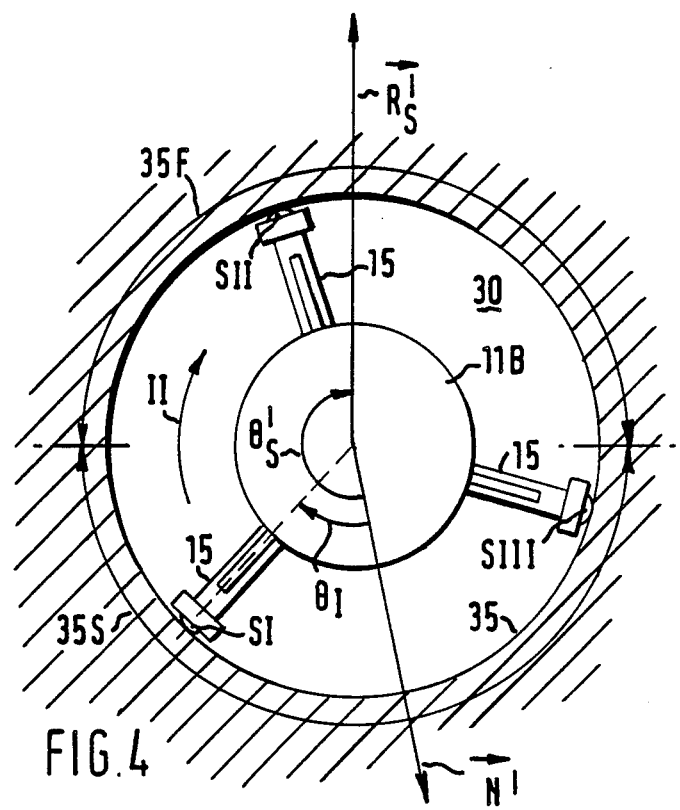
FIG. 4 is a horizontal cross section of the relief well taken along line IV—IV of FIG. 2.

FIG. 4 shows a cross section taken along line IV—IV in FIG. 2 of the lower part of the instrument 1, at the level of the acoustic sensors SI-SIII. The arms 15 are in mechanical contact with the borehole wall 35 at tangential intervals of 120°. The orthogonal projection of the earth magnetic field vector on the plane of cross section is indicated as $\vec{N}'$ and the orthogonal projection of a position vector $\vec{R}_S$ on this plane is indicated as $\vec{R}_S'$. The position vector $\vec{R}_S$ extends from the intersection of axis I and said plane to the source position S (see FIG. 2).

With respect to the direction of the position vector $\vec{R}_S$, i.e. its projection $\vec{R}_S'$ on the plane of cross section the borehole wall 35 may be divided in two halves: a "front area" 35F which is oriented towards the source S and a "shadow area" 35S which is oriented backwards with respect to the source S. If the frequency components of the acoustic waves W detected by means of the sensors SI-SIII are restricted, e.g. by electronic filtering means, to a frequency band of which the corresponding wavelengths are of the order of several times the diameter of the relief well 30, the acoustic intensity J at the borehole wall 35 resulting from these waves W is always significantly larger in the front area 35F than in the shadow area 35S, with a distinct maximum in the direction of the projection $\vec{R}_S'$ of the position vector. As a result thereof the acoustic intensity $J_{II}$ detected by the second sensor SII, which is located in the front area 35F, is significantly larger than the acoustic intensities $J_I$ and $J_{III}$ detected by the other sensors SI and SIII that are located in the shadow area 35S.

Figure 5:
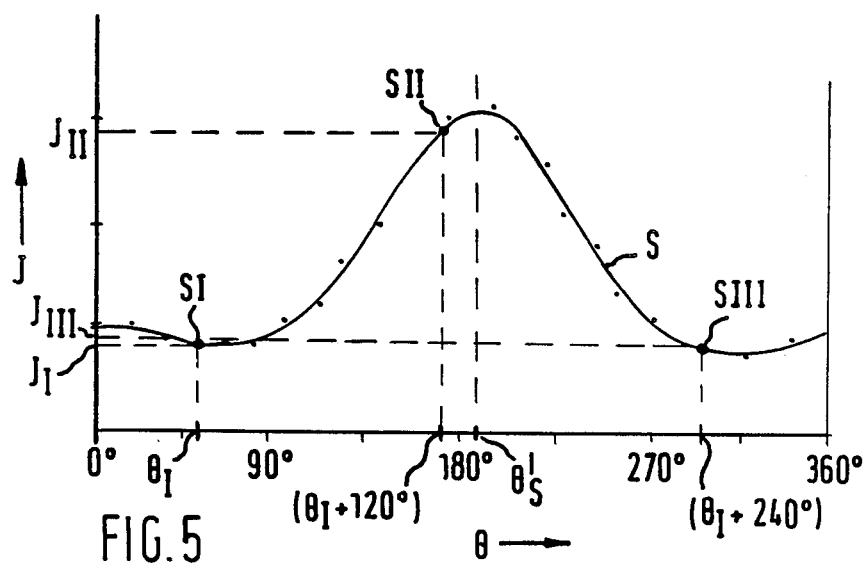
FIG. 5 is a diagram in which the acoustic intensity J sampled by the acoustic sensors of the instrument in the position thereof shown in FIG. 4 is plotted.

In the diagram of FIG. 5 the acoustic intensity J detected by each of the sensors is plotted along the vertical axis, whereas the tangential position, i.e. the azimuth $\theta$ of the sensors, is plotted along the horizontal axis of this diagram. When indicating the tangential position of the first sensor SI of the sensor assembly by its azimuth $\theta_I$, the tangential positions of the other sensors SII and SIII of the assembly can be indicated by ($\theta_I + 120°$) and ($\theta_I + 240°$), respectively.

Subsequently the assembly of sensors SI-SIII is rotated by rotating the lower frame section 11B, which carries the sensors, relative to the upper frame section 11A (see arrows II in FIGS. 1B and 4) over a limited angle, whereafter the acoustic intensities $J_I$-$J_{III}$ detected by the sensors SI-SIII and the novel azimuth positions thereof are plotted in the diagram of FIG. 5.

By repeating the above rotating/plotting procedure several times a diagram as shown in FIG. 5 will be produced, in which diagram the sequentially plotted intensities J detected by the sensors SI-SIII lie on a curve S with the maximum thereof located at an azimuth $\theta_S'$. The azimuth $\theta_S'$ thus found indicates the azimuth orientation of the projection $\vec{R}_S'$ of the position vector $\vec{R}_S$ on the plane of cross section (plane IV—IV).

In the situation shown in FIG. 2 the relief well 30 is straight. In this situation the azimuth of the distance vector $\vec{D}_S$, i.e. of its orthogonal projection $\vec{D}_S'$ on plane IV—IV is identical to the azimuth $\theta_S'$ of the position vector $\vec{R}_S$, i.e. of its projection $\vec{R}_S'$ on plane IV—IV.

It is observed that in case the relief well is curved, the azimuth $\theta_S'$ determined in the manner described above and which corresponds to the azimuth of the position vector $\vec{R}_S$, may differ from the azimuth of the distance vector $\vec{D}_S$. It will be appreciated that in that situation the azimuth of the distance vector $\vec{D}_S$ can be determined in a straightforward manner on the basis of the azimuth $\theta_S'$ either by determining the course of the relief well 30 by means of separate logging operations or by lowering or raising the instrument 1 to such a depth in the relief well 30 that the sensor assembly SI-SIII is located at the depth $z_X$ at which the distance vector $\vec{D}_S$ intersects the central axis of the well 30, such that the vector $\vec{D}_S$ coincides with $\vec{R}_S$.

By combining the information thus obtained by means of the assembly of tangentially spaced sensors SI-SIII on the azimuth of the distance vector $\vec{D}_S$ with the information obtained by means of the assembly of axially spaced receivers HI and HII on the magnitude of the distance vector $D_S$ and the depth $z_X$ at which this vector intersects the central axis of the relief well, the position of the source location S has been determined in an accurate manner.

It will be appreciated that by detecting acoustic waves in an appropriate frequency band also acoustic waves emanating from other distinct acoustic sources in the blowing well than the source location S can be detected by means of the instrument 1. Such distinct acoustic sources may be valves, curvatures in the well, casing ends, or other flow restrictions, etc. In this manner the instrument can also be used to find the position of parts of the relief well above the source location S.

It will further be understood that, if desired, instead of using a sensor assembly with three sensors also assemblies with any other number of sensors may be used. The use of three sensors, however, has the advantage that in a borehole with non-circular cross section a good mechanical contact can be established between each of the sensors and the borehole wall.

Finally, it will be understood that instead of mounting the frame 11 carrying the sensors SI–SIII on the lower end of the wireline that carries the receivers HI–HIII, the frame may also be mounted on another, separate, wireline that can be run into the relief well when the wireline carrying the receivers HI–HIII is removed therefrom. In this manner the determination is made of the azimuth of the distance vector $\overline{D}_S$ and the depth $z_X$ at which this vector intersects the longitudinal axis of the relief well.

What is claimed is:

1. A method for determining the subsurface position of a blowing well with respect to a relief well, said method comprising:
   detecting at a plurality of axially spaced locations along the longitudinal axis of the relief well acoustic waves emanating from a subsurface location in the blowing well;
   determining the difference in the times of arrival of said acoustic waves at said axially spaced locations;
   detecting said acoustic waves at a first plurality of circumferentially spaced first locations at a predetermined axial location along the wall of said relief well, the plane of said circumferentially spaced locations being substantially normal to the axis of said relief well;
   measuring the intensity of the acoustic waves arriving at said circumferentially spaced first locations;
   subsequently again detecting said acoustic waves at a second plurality of circumferentially spaced second locations substantially at said predetermined axial location and located at positions rotated along the wall of said relief well from said first locations;
   measuring the intensity of the acoustic waves arriving at said circumferentially spaced second locations; and
   using said time difference and intensity measurements to compute the distance and azimuth between said relief well and said blowing well.

2. The method of claim 1, wherein the detection of acoustic waves at said axially spaced locations is carried out by means of an array of acoustic receivers, the receivers being suspended at predetermined intervals along the longitudinal axis of the relief well.

3. The method as claimed in claim 2, wherein the signal produced by each of the receivers in response to the detection of acoustic waves is transmitted to a computer unit, in which (a) the signal produced by each receiver is recorded; (b) the signals thus obtained are correlated in order to determine on the basis of time delays between these signals the differences in arrival times of the acoustic waves at the various receivers; and (c) the distance between the wells is calculated on the basis of the arrival time differences thus determined.

4. The method as claimed in any one of claims 1–3, wherein the detection of acoustic waves at said circumferentially spaced locations is carried out by means of an assembly of acoustic sensors that are in contact with the borehole wall of the relief well.

5. The method as claimed in claim 4, wherein the azimuth of the location of each of the sensors is determined and related to the intensity of acoustic waves detected thereby in order to find the radial direction of the blowing well with respect to the relief well.

6. An apparatus for determining the subsurface position of a blowing well with respect to a relief well, comprising:
   an array of acoustic receivers carried by an elongate support, the receivers being disposed at predetermined intervals along the longitudinal axis of the support;
   a frame carrying an assembly of acoustic sensors, said sensors being disposed so that each sensor is movable in a substantially radial direction with respect to a central axis of the frame;
   means rotatably attaching at least a portion of said frame to said elongate support for rotating at least said sensors, relative to said support, substantially on said longitudinal axis of said support; and
   means for measuring the angular displacement of said sensors relative to said support.

7. The means as claimed in claim 6, wherein the support consists of a support cable, the frame being connected to the lower end of the support cable such that the central axis of the frame coincides with the longitudinal axis of the lower part of the support cable.

8. The means as claimed in claim 6 or 7, wherein the acoustic receivers are hydrophones.

9. The means as claimed in claim 6 or 7, wherein each acoustic sensor comprises a plurality of accelerometers disposed to measure accelerations in three mutually orthogonal directions.

10. The means as claimed in claim 6 or 7, wherein the frame consists of an upper and a lower frame section, said central axis coincides with said longitudinal axis, said sections are rotatable relative to each other about the central axis, and the lower frame section includes a plurality of pivot arms, each arm carrying an acoustic sensor and being pivotal in a plane of rotation traversed by the central axis.

11. The means as claimed in claim 10, wherein the lower frame section includes three arms being pivotal in planes of rotation intersecting each other at angles of 120°.

12. The means as claimed in claim 11, wherein the upper frame section includes a compass and means for measuring the relative angle between the frame sections.

13. A method for determining the subsurface position of a blowing well with respect to a relief well, said method comprising:
   (a) with an array of acoustic receivers suspended at a plurality of axially spaced locations along the longitudinal axis of the relief well, detecting at said plurality of axially spaced locations acoustic waves emanating from a subsurface location in the blowing well, (b) transmitting the signals produced by each of the receivers in response to the detection of such acoustic waves to a computer unit in which:
   (i) the signal produced by each receiver is recorded,
   (ii) the signals thus obtained are correlated in order to determine on the basis of time delays between these signals the differences in arrival times of the acoustic waves at the various receivers, and
   (iii) the distance between the wells is calculated on the basis of the arrival time differences thus determined, (c) with an assembly of acoustic sensors in contact with the borehole wall of the relief well, detecting said acoustic waves at a first plurality of circumferentially spaced first locations at a predetermined axial location along the wall of said relief well, the plane of said circumferentially spaced locations being substantially normal to the axis of said relief well, (d) determining the azimuth of the location of each of the sensors and measuring the intensity of the acoustic waves arriving at said circumferentially spaced first locations, (e) with the same assembly of acoustic sensors, subsequently again detecting said acoustic waves at a second plurality of circumferentially spaced second locations substantially at said predetermined axial location and located at positions rotated along the wall of said relief well from said first locations, (f) determining the azimuth of the location of each of the sensors and measuring the intensity of the acoustic waves arriving at said circumferentially spaced second locations, and (g) relating the intensity of the acoustic waves detected thereby to find the radial direction of the blowing well with respect to the relief well.

14. An apparatus for determining the subsurface position of a blowing well with respect to a relief well, comprising:

(a) a support cable, (b) an array of acoustic hydrophone receivers carried by said support cable, said receivers being disposed at predetermined intervals along the longitudinal axis of said support cable, (c) a frame connected to the lower end of said support cable such that the central axis of said frame coincides with the longitudinal axis of the lower part of said support cable, said frame including:
   (i) upper and lower frame sections, said sections being rotatable relative to each other about said central axis,
   (ii) means for rotating said frame sections relative to each other about said central axis, and
   (iii) three pivot arms on said lower frame section pivotally mounted in planes of rotation intersecting each other at angles of 120°, and being pivotal in a plane of rotation traversed by said central axis, (d) a compass on said upper frame section, (e) an assembly of acoustic sensors supported on said frame, each said sensor being a plurality of accelerometers disposed to measure accelerations in three mutually orthogonal directions, and each of said pivot arms carrying an acoustic sensor such that each said sensor is movable in a substantially radial direction with respect to said central axis of said frame, and (f) means on said frame sections for measuring the relative angle between said frame sections, thereby measuring the angular displacement of said sensors relative to said support.

* * * * *